United States Patent [19]

Seki et al.

[11] Patent Number: 5,197,014
[45] Date of Patent: Mar. 23, 1993

[54] INTERPOLATION METHOD IN AUTOMATIC PROGRAMMING

[75] Inventors: Masaki Seki, Suginami; Takashi Takegahara, Hachioji; Koichi Ito, Oshino, all of Japan

[73] Assignee: Fanuc Ltd., Minamitsuru, Japan

[21] Appl. No.: 536,546

[22] PCT Filed: Nov. 22, 1989

[86] PCT No.: PCT/JP89/01194
 § 371 Date: Jul. 10, 1990
 § 102(e) Date: Jul. 10, 1990

[87] PCT Pub. No.: WO90/06545
 PCT Pub. Date: Jun. 14, 1990

[30] Foreign Application Priority Data

Nov. 29, 1988 [JP] Japan ................... 63-299646

[51] Int. Cl.$^5$ .............................. G05B 19/415
[52] U.S. Cl. ..................... 364/474.31; 318/573
[58] Field of Search ............ 364/474.28, 474.29, 364/474.31; 318/570, 573

[56] References Cited

U.S. PATENT DOCUMENTS

| 3,720,814 | 3/1973 | Klein ............................ 318/573 |
| 3,727,191 | 4/1973 | McGee ..................... 364/474.31 |
| 4,550,383 | 10/1985 | Susimoto ...................... 318/573 |
| 4,581,698 | 4/1986 | Jaswa ....................... 364/474.31 |
| 4,648,024 | 3/1987 | Kato et al. ................... 318/573 |
| 4,704,688 | 11/1987 | Kamuta ..................... 364/474.31 |
| 4,858,140 | 8/1989 | Buhler et al. .................. 318/573 |
| 4,903,213 | 2/1990 | Buhler et al. .................. 318/573 |

FOREIGN PATENT DOCUMENTS 61-286908 12/1986 Japan.
62-260206 11/1987 Japan.
63-205709 8/1988 Japan.

OTHER PUBLICATIONS

English Translation of the Abstract of 62-260206.
English Translation of the Abstract of 63-205709.
English Translation of the Abstract of 61286908.

Primary Examiner—Jerry Smith
Assistant Examiner—Jim Trammell
Attorney, Agent, or Firm—Staas & Halsey

[57] ABSTRACT

An interpolation method in an automatic programming, capable of properly determining and programming target movement amounts for individual axes in each interpolation cycle at the time of executing a numerical control program. In the case where the length (P') of the last one of a plurality of sub-sections, obtained by dividing a section from the starting point (A) to the end point (B) of each block in a program by a target movement amount (P) per interpolation cycle, is smaller than the value (P), and when an angle (θ) between the paths of the block concerned and the next block is smaller than a reference angle or when the angle (θ) is larger than the reference angle and the sub-section length (P') is smaller than a reference length, an intersection at which a sphere having the starting point (an) of the last sub-section as its center and theh value (P) as its radius crosses the target movement path of the next block is derived by the overlapping process, and the interpolation process for the last sub-section is effected with the intersection used as the target end point of the last sub-section. On the other hand, when the angle (θ) and the length (P') are larger than the reference angle and reference length, respectively, the interpolation process is effected with the original end point (B) used as the target end point of the last sub-section, without effecting the overlapping process.

5 Claims, 5 Drawing Sheets

INTERPOLATION METHOD IN AUTOMATIC PROGRAMMING

BACKGROUND OF THE INVENTION

1. Field of the Invention

The present invention relates to an automatic programming method, and more particularly, to an interpolation method in an automatic programming, which is capable of properly determining and programming target amounts of movement of individual axes to be used in each interpolation cycle at the time of execution of a numerical control program for contour control.

2. Description of the Related Art

A so-called contour control for machining a workpiece into a desired profile is conventionally known, in which actuators such as servomotors for the individual axes of a machine tool are driven under the control of a numerical control unit, to thereby move a tool along a target movement path. Generally, in such contour control, target movement data for each interpolation cycle is sequentially supplied from the numerical control unit at intervals of a predetermined interpolation cycle. In a case in which target positions of the servomotors for the individual axes are calculated on a real time basis by the interpolation process based on this movement data, the machining speed is decreased if a time period required for the calculation is long. Therefore, from the viewpoint of improving the machining speed, it is desired to create that numerical control program for the contour control in which the target positions of the individual axes in each interpolation processing cycle are previously programmed as execution data.

To this end, conventionally, the target amounts of movement of the servomotors for the individual axes in each of sub-sections are calculated and then programmed as execution data, the sub-sections being obtained by dividing each section, defined by the starting point A (FIGS. 6 and 7) of an associated one block of the numerical control program consisting of a series of blocks and the target end point (starting point of the next block) B of the same block determined by the movement command value of this block, by a length equal to a target movement amount P (the product of the target moving speed and one interpolation period) per interpolation period. If the target movement amount P per interpolation period does not divide the movement command, i.e., if the last sub-section is shorter than the target movement amount P (FIG. 6), an overlapping process is effected to derive an intersection b1 at which a sphere, having the starting point an of the last sub-section as its center and the target movement amount P as its radius, crosses the target movement path of the next block. Then, the derived intersection b1 is used as the target end point of the last sub-section of one of the blocks relating to the overlapping process (which end point corresponds to the starting point of the first sub-section of the other block).

According to the numerical control program created by the above overlapping process, as far as an angle θ between the target movement paths of the two blocks relating to the overlapping process is small, the target movement amounts of the individual axes in the last interpolation cycle of one of the two blocks relating to the overlapping process (the first interpolation cycle of the other block) will not be set to such an inappropriate value as to cause the target path (indicated by a broken line in the drawing) obtained after the overlapping process to be excessively deviated from the originally intended path (shown by a solid line in the drawing) and thus degradation in the machining precision. However, as the angle θ between the two target movement paths becomes larger, the target movement amounts for the individual axes after the overlapping process will be more inappropriate, thus lowering the machining precision (FIG. 7).

SUMMARY OF THE INVENTION

An object of the present invention is to provide an interpolation method in an automatic programming, which is capable of properly determining and programming target amounts of movement for individual axes to be used in each interpolation cycle at the time of execution of a numerical control program, thereby making it possible to improve the machining speed and machining precision.

To achieve the above-mentioned object, an interpolation method in an automatic programming of the present invention comprises the steps of: (a) deriving target movement amounts for individual axes, with respect to those of a plurality of sub-sections which are obtained by dividing a section from a starting point to a target end point of each of blocks constituting a numerical control program, and which are equal in length to a target movement amount per interpolation period; (b) checking whether or not a length of a last sub-section in each of the blocks is smaller than the target movement amount; (c) checking whether or not a predetermined condition for permitting execution of an overlapping process is satisfied for each of the last sub-sections which are determined to have a length smaller than the target movement amount; (d) effecting the overlapping process to derive target movement amounts for individual axes in each of those last sub-sections for which it is determined that the predetermined condition is satisfied; and (e) deriving target movement amounts for the individual axes in each of those last sub-sections for which it is determined that the predetermined condition is not satisfied, without effecting the overlapping process.

Preferably, in the step (b), a determination is made as to whether or not an angle between a target movement path of each of the blocks and a target movement path of a block adjacent to said each block is smaller than a reference angle, and it is determined that the predetermined condition is satisfied for the last sub-section associated with the determination, when the angle between the target movement paths is smaller than the reference angle.

Still preferably, in the step (b), a determination is made as to whether or not the length of the last sub-section in each block is smaller than a reference length, and it is determined that the predetermined condition is satisfied for the last sub-section associated with the determination, when the length of the last sub-section is smaller than the reference length.

As described above, according to the present invention, the target movement amounts for the individual axes are derived by the overlapping process when the length of the last one of the plurality of sub-sections obtained by dividing each of the blocks constituting the numerical control program is smaller than the target movement amount per interpolation period and the predetermined condition for the last sub-section is satisfied, whereas the target movement amounts of the individual axes in the last sub-section are derived without effecting the overlapping process when the predetermined condition is not satisfied. Accordingly, the machining speed can be prevented from being lowered and the machining precision can be improved, as compared with the case wherein the target movement amounts for the individual axes in all of the last sub-sections whose length is smaller than the target movement amount are derived by the overlapping process. Further, since the target movement amounts of the individual axes for the last sub-section whose length is smaller than the reference length are derived by the overlapping process, even when the angle between the target movement path of one block and the target movement path of a block adjacent thereto is larger than the reference angle, the machining operation can be effected at the same machining speed as that for the other sub-sections without lowering the machining precision, thus making it possible to smoothly effect the machining operation.

DESCRIPTION OF THE PREFERRED EMBODIMENTS

Figure 1:
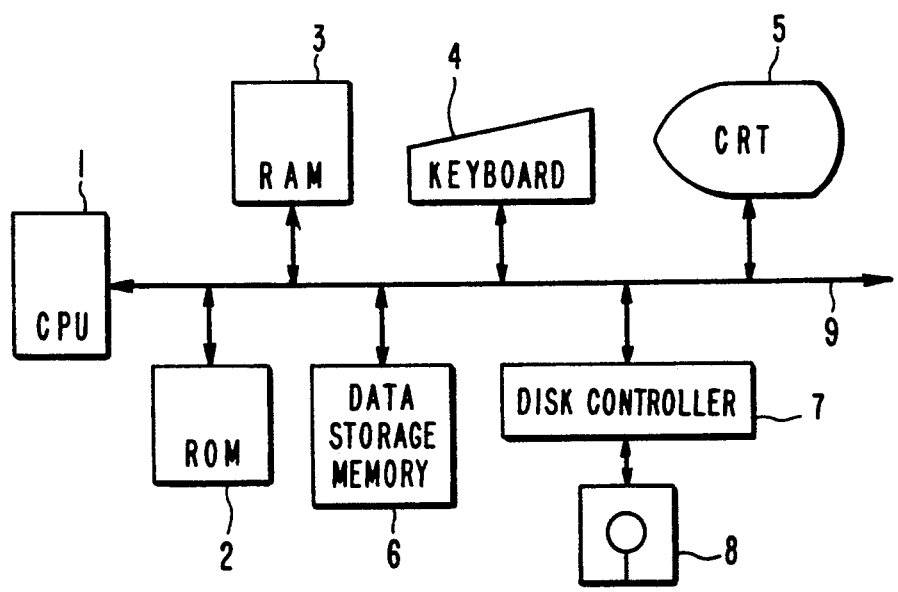
FIG. 1 is a schematic block diagram showing an automatic programming apparatus to which an interpolation method according to one embodiment of the present invention is applied.

Referring to FIG. 1, an interactive automatic programming apparatus, which is known in the art and to which an interpolation method according to one embodiment of the present invention is applied, comprises a central processing unit (hereinafter referred to as CPU) 1, a read-only memory (ROM) 2 storing a control program for operating the programming apparatus, and a random-access memory (RAM) 3 for storing a numerical control (NC) program and for temporarily storing data which is processed by the CPU 1. The programming apparatus further includes a keyboard 4, a graphic display device (hereinafter referred to as CRT) 5, a data storage memory 6 for storing execution data, and a disk controller 7. The aforesaid elements 2-7 are connected to the CPU 1 through busses 9.

The automatic programming apparatus is arranged to cause the RAM 3 to store an NC program, which is automatically created in response to operator's keyboard operations effected in light of various messages displayed on the CRT 5. The programming apparatus is also operable to read out, via the disk controller 7, an NC program prepared and stored in the floppy disk 8 beforehand, or read out, via a tape reader (not shown), an NC program prepared beforehand, and cause the RAM 3 to store the thus read program.

For example, the NC program of this embodiment is used to drive a tool of a machine tool (not shown) provided with an NC unit, by means of three servomotors for X-axis, Y-axis and Z-axis, so as to move the tool along a 3-dimensional tool path constructed by a plurality of sections which include two linear sections AB and BC, to thereby machine a workpiece (not shown) into a desired profile. To this end, the program includes a plurality of blocks corresponding to these sections and including movement commands. Each of the sections is constructed by a plurality of sub-sections having the same length as a target movement amount (the product of the interpolation period and the target moving speed) P per interpolation cycle and a last sub-section having a length which is the same as or smaller than the value P.

The automatic programming apparatus is arranged to derive target amounts of movement of the individual axes for respective interpolation cycle in each of the blocks including the movement commands, and store the same as execution data. Further, during the execution of each of the blocks including the movement commands, the NC unit is operable to read out the programmed target movement amounts of the individual axes from the NC program and supply the same to servo-circuits (not shown) associated with the individual axes, without calculating target movement amounts for the individual axes in each interpolation period on a real time basis.

Now, the operation of the automatic programming apparatus will be explained.

Figure 2:
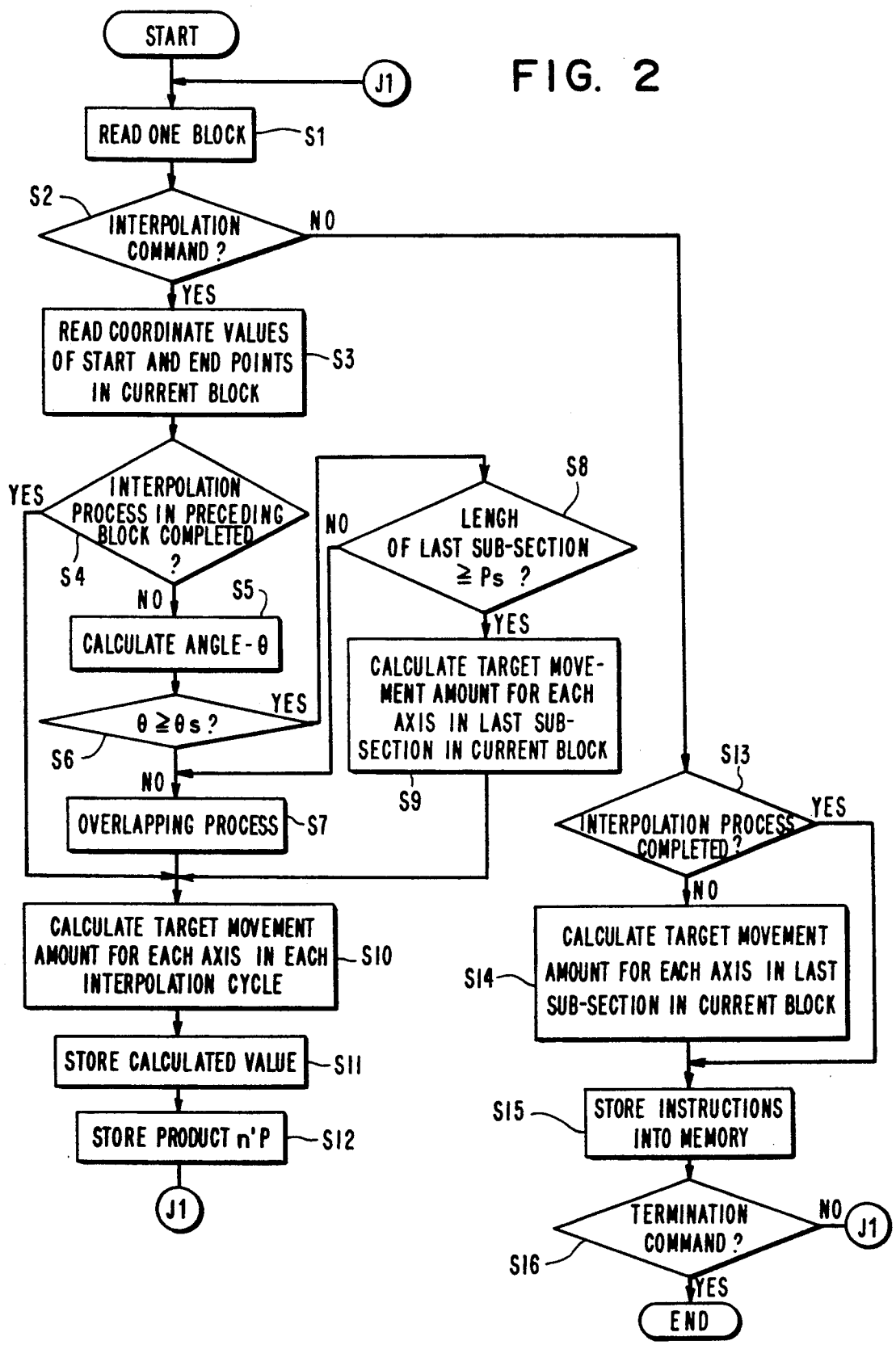
FIG. 2 is a flowchart of an execution data creation process executed by the apparatus shown in FIG. 1.
Figure 3:
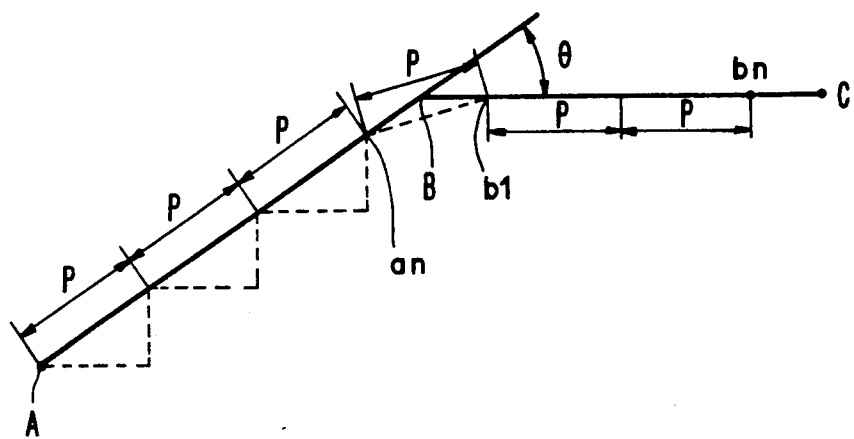
FIG. 3 is a diagram illustrating the interpolation process of FIG. 2, in a case wherein an angle between target movement paths is smaller than a reference angle.

Prior to creation of execution data, the operator inputs, through the keyboard 4, a criterion value $\theta s$ in relation to an angle $\theta$ between the target movement paths (indicated, by way of example, by straight lines AB and BC in FIG. 3) of adjacent blocks, and a criterion value Ps in relation to the target movement amount in the last sub-section of each block, these criterion values being employed for determination as to whether or not the overlapping operation should be made. In response to the operator's operation, the CPU 1 of the automatic programming apparatus causes the RAM 3 to store the criterion values $\theta s$ and Ps. Whereupon, the CPU 1 starts the execution data creating process of FIG. 2 when an execution data creating command is input by the operator through the keyboard 4.

At first, the CPU 1 reads from the RAM 3 one of the blocks in the NC program, serving as the basis for creation of the execution data (step S1), and checks whether or not the movement command or interpolation command is included in the block (step S2). Since the first block, read out immediately after the start of the process of FIG. 2, does not include an interpolation command, the result of the determination at step S2 is negative (NO). Then, a determination is made as to whether or not the interpolation process is completed up to the target end point of a block preceding the block read out at step S1 (step S13). Since the determination result at step S13 regarding the first block is affirmative (YES), the instruction in the block read out at step S1 is stored in the data storage memory 6 (step S15). Next, the CPU determines whether or not a termination command is included in the block read out at step S1 (step S16). Since the determination result at step S16 regarding the first block is negative, step S1 is entered again and the next block is read out.

Subsequently, if it is determined, at step S2 of a certain execution data creation processing cycle, that the block read out at step S1 of the same processing cycle includes an interpolation command, the CPU reads the coordinate values of the starting point and the target end point (which are respectively indicated, by way of example, by symbols B and C in FIG. 3) in this block (step S3). Then, the CPU determines whether or not the interpolation process is completed up to the target end point B of the block immediately before the block read out at step S1 of the current processing cycle (step S4). More specifically, the CPU determines whether or not the target movement amount P per one interpolation period divides the instructed movement amount of the preceding block, that is, whether or not the product nP (corresponding to the coordinate value of the point an in FIG. 3) of the value P and the value n of the integer part of a quotient (=instructed movement amount/P) obtained by executing a step, corresponding to step S11 (mentioned later) in a processing cycle prior to the current processing cycle, coincides with the target end point B of the preceding block.

If the determination result at step S4 is affirmative, i.e., if the interpolation process is completed up to the target end point B of the preceding block, step S10 is entered to start the interpolation process for the block read out at step S1 in the current processing cycle. In step S10, the CPU divides the target movement amount of the current processing cycle by the target movement amount P per interpolation cycle, and determines a value n' of the integer part of the resultant quotient. Then, the CPU calculates the target movement amount (incremental amount) for each of the axes in each interpolation cycle, and causes the data storage memory 6 to repetitively store the thus calculated value required times corresponding to the aforesaid value n' (step S11). The product n'P of the value n' and the value P representative of the coordinate position of the target end point C or the coordinate position of the starting point bn of the last sub-section in the current block is stored (step S12), thus completing the interpolation process for the current block, and step S1 is entered again.

On the other hand, if the determination result at step S4 is negative, i.e., if the interpolation process up to the target end point B of the preceding block is not completed as yet, step S5 is entered to start the interpolation process for the last sub-section of the preceding block. In step S5, the CPU calculates an angle $\theta$ between the target movement path BC of the current block and the target movement path AB of the preceding block on the basis of the coordinate positions of the starting point an (=nP) of the last sub-section of the preceding block, and the starting point B and target end point C of the current block. Next, the CPU determines whether or not the calculated angle $\theta$ is equal to or larger than the reference angle $\theta$s (step S6). If the determination result is negative (FIG. 3), the CPU executes the overlapping process (step S7).

That is, at first, the CPU calculates the coordinate value of an intersection b1 at which a sphere, having the starting point an of the last sub-section of the preceding block as its center and the target movement amount P per cycle as its radius, intersects the target movement path BC of the current block. Next, the CPU causes the data storage memory 6 to store the intersection b1 as the target end point of the last sub-section in the preceding block (starting point of the current block). Then, the CPU calculates and stores the target movement amount for each of the individual axes in the last sub-section (interpolation period). The resultant target moving speed in the last sub-section of the preceding block is equal to that of the other sub-sections, and at least part of the resultant target movement amounts for the individual axes in the last sub-section is different from that of the other sub-sections. When the interpolation process (overlapping process) for the last sub-section of the preceding block is completed in this manner, the aforesaid steps S10 to S12 are executed to carry out the interpolation process for the respective sub-sections of the current block. In this case, since the overlapping process has been carried out at step S7 so that the starting point of the current block is corrected from the point B to the point b1, it is necessary to correct the target movement amount of the current block, which is to be divided by the value P at step S10.

Figure 4:
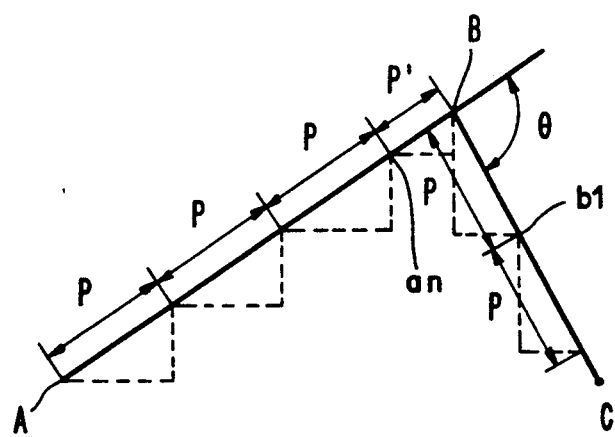
FIG. 4 is a diagram similar to FIG. 3, in a case wherein the overlapping process is inhibited.
Figure 5:
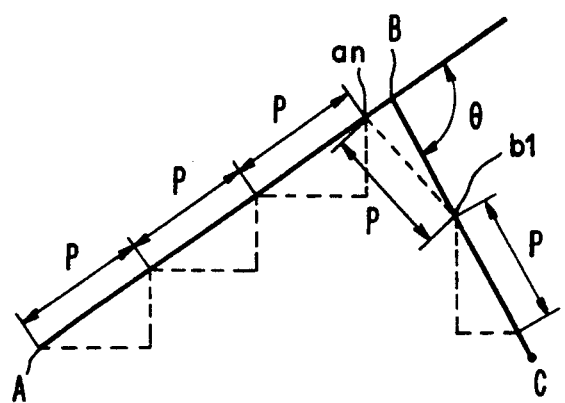
FIG. 5 is a diagram similar to FIG. 3, in a case wherein an angle between target movement paths is larger than the reference angle.
Figure 6:
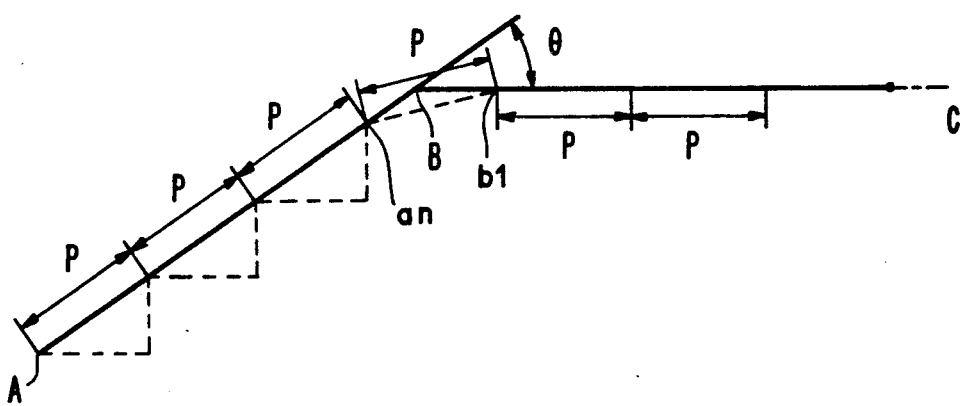
FIG. 6 is a diagram illustrating a conventional interpolation process in a case wherein an angle between target movement paths is small.
Figure 7:
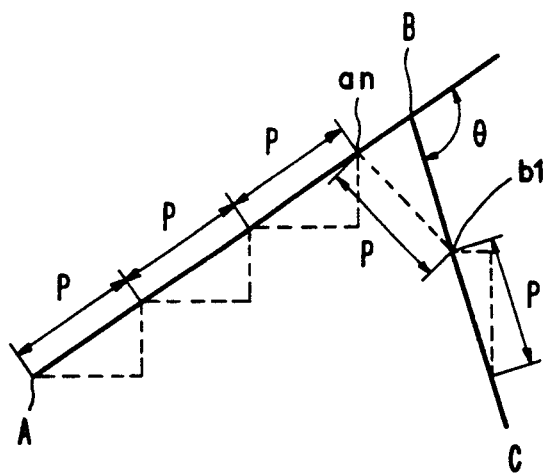
FIG. 7 is a diagram illustrating a conventional interpolation process in a case wherein an angle between target movement paths is large.

In connection with the interpolation process for the last sub-section of the preceding block, if the determination result at step S6 is affirmative, i.e., if it is determined that the angle $\theta$ between the target path of the preceding block and that of the current block is equal to or larger than the criterion angle $\theta$s, the CPU 1 checks whether or not the distance between the target end point B and the starting point an of the last sub-section of the preceding block is equal to or larger than the criterion length Ps (step S8). If the determination result is negative, i.e., if the length of the last sub-section is smaller than the value Ps (FIG. 5), the aforesaid overlapping process step S7 is entered to carry out the interpolation process for the last sub-section of the preceding block in the same manner as described above. Then, the interpolation process for the current block is carried out. On the other hand, if both the determination results at steps S6 and S8 are affirmative, i.e., if the angle $\theta$ between the two target paths is equal to or larger than the reference angle $\theta$s and at the same time the length of the last sub-section is equal to or larger than the reference length Ps (FIG. 4), the overlapping process is not effected in the interpolation process for the last sub-section of the preceding block. Alternatively, the CPU calculates and stores target movement amounts of the individual axes for the last sub-section on the basis of the coordinate values of the target end point B and the starting point an of the last sub-section. As a consequence, the target moving speed and at least part of the target movement amounts of the individual axes in the last sub-section are made different from those in the other sub-sections. In this way, when the interpolation process for the last sub-section of the preceding block is completed, steps S10 to S12 are executed to effect the interpolation process for the respective sub-sections of the current block. In this case, unlike the case wherein the overlapping process is effected, correction of the starting point in the current block is unnecessary.

In a case where an interpolation command is included in the preceding block but not in the current block, the flow proceeds from step S2 to step S13 to check whether or not the interpolation process for the last sub-section of the preceding block is completed. If the determination result is negative, a target movement amount for each of the axes in the corresponding sub-section is derived and stored at step S14 corresponding to step S9, and then the instruction in the current block is stored in the data storage memory 6 (step S15).

Subsequently, if it is determined at step S16 that the blocl read out at step S1 in a certain processing cycle includes a termination command, the execution data creation process of FIG. 2 is ended. In this way, the numerical control program for contour control that has been subjected to the interpolation process is stored in the data storage memory 6. The CPU 1 transfers the program having been subjected to the interpolation process from the memory 6 to a floppy disk 8 loaded in a disk controller 7, for instance.

When the numerical control program for contour control having been subjected to the interpolation process is input from the floppy disk 8 to the numerical control unit (not shown) and then the machine tool is operated under the control of the control unit, the numerical control unit reads out corresponding ones of target movement amounts for the individual axes from the program in each interpolation cycle, to move the tool along a series of target movement paths and thereby machine the workpiece into a desired profile. During this time, it is unnecessary to calculate the target movement amounts for the individual axes on a real time basis, whereby a high-speed machining operation can be effected.

During the execution of a certain block of the program, if the length of the last sub-section of the block is smaller than the target movement amount P per interpolation period and at the same time the angle $\theta$ between the paths of the same block and the block next thereto is smaller than the reference angle $\theta s$ (FIG. 3), or if the angle $\theta$ is equal to or larger than the reference angle $\theta s$ and at the same time the length of the last sub-section is smaller than the target movement amount P and the reference length Ps (FIG. 5), the numerical control unit drives the tool in accordance with the target movement amounts of the individual axes that have been subjected to the interpolation process. Consequently, the machining operation in the last sub-section is effected at the same speed as in the other sub-sections, and the tool can be moved along the target movement path (indicated by broken lines in FIGS. 3 and 5) which will not be significantly deviated from the intended movement path (indicated by solid lines in FIGS. 3 and 5). Thus, no substantial loss of the machining precision will be entailed.

On the other hand, when the angle $\theta$ is equal to or larger than the reference angle $\theta s$ and at the same time the length of the last sub-section is smaller than the target movement amount P and equal to or larger than the reference length Ps (FIG. 4), the numerical control unit drives the tool in accordance with the target movement amounts for the individual axes determined without effecting the overlapping process. As a result, the target tool movement path is not significantly deviated from the intended movement path and the machining precision can be maintained.

We claim:

1. An interpolation method for automatic programming associated with a numerically controlled machining apparatus, comprising the steps of:
   (a) deriving target movement amounts for individual axes corresponding to a plurality of sub-sections which are obtained by dividing a section from a starting point to a target end point of each of blocks constituting a numerical control program, and which have lengths defined by a product of a target moving speed of the numerically controlled apparatus and an interpolation period;
   (b) determining whether the length of a last sub-section in each of the blocks is smaller than the target movement amount;
   (c) determining whether a predetermined condition for permitting execution of an overlapping process is satisfied for each of the last sub-sections which are determined to have a length smaller than the target movement amount in said step (b);
   (d) effecting the overlapping process to derive target movement amounts for individual axes in each of those last sub-sections for which said determining of said step (c) establishes that the predetermined condition is satisfied;
   (e) deriving target movement amounts for the individual axes in each of those last sub-sections for which said determining in said step (c) establishes that the predetermined condition is not satisfied, without performing said step (d); and
   (f) machining a workpiece using the numerically controlled machining apparatus, based on said steps (d)–(e).

2. An interpolation method for automatic programming according to claim 1, wherein said step (b) comprises the substeps of:
   (b1) determining whether an angle between a target movement path of each block and a target movement path of a block adjacent to said each block is smaller than a reference angle, and
   (b2) determining that the predetermined condition is satisfied for the last sub-section based on a determination in said substep (b1) that the angle between the target movement paths is smaller than the reference angle.

3. An interpolation method for automatic programming according to claim 1, wherein said step (b) comprises the substeps of:
   (b1) determining whether the length of the last sub-section in each block is smaller than a reference length, and
   (b2) determining that the predetermined condition is satisfied for the last sub-section based on a determination in said substep (b1) that the length of the last sub-section is smaller than the reference length.

4. An interpolation method for automatic programming according to claim 1, further comprising the steps of:
   (g) subsequentially reading out the blocks in the numerical control program;
   (h) checking whether the blocks read in said step (g) include a movement command;
   (i) storing each of the blocks which include no movement command, without executing said steps (a) through (e); and
   (j) storing target movement amounts for the individual axes derived by executing said steps (a), (d) and (e) for the blocks including the movement command.

5. A method for machining a workpiece having a target shape with first and second sides using a numerical control program including first and second blocks corresponding to the first and second sides, respectively, comprising the step of:
   (a) generating target movement amounts of substantially equal length, from the first block;
   (b) generating a last target movement amount from the first block;
   (c) determining whether the last target movement amount is substantially equal to one of the target movement amounts of said step (a);
   (d) determining an angle between the first and second sides of the target workpiece in response to a determination in said step (c) that the last target amount is less than one of the target movement amounts;

(e) determining whether the angle of said step (d) is less than a predetermined angle, and whether the last target movement amount of said step (b) is less than a predetermined length;

(f) executing an overlapping process to establish a starting position for determining target movement amounts for the second block in response to a determination in said step (e) that the angle of said step (e) is not less than the predetermined angle or that the last target movement amount is not less than the predetermined length;

(g) determining the starting position for determining target movement amounts for the second block without executing the overlapping process of said step (f) in response to a determination in said step (e) that the angle of said step (e) is less than the predetermined angle and the last amount of movement is less than the predetermined length; and (h) machining the workpiece based on said steps (a)–(g).

* * * * *